United States Patent
Dudar et al.

(10) Patent No.: US 11,933,251 B2
(45) Date of Patent: Mar. 19, 2024

(54) FUEL SYSTEM FUEL VAPOR RECIRCULATION SYSTEM AND METHOD

(71) Applicant: FORD GLOBAL TECHNOLOGIES, LLC, Dearborn, MI (US)

(72) Inventors: Aed M. Dudar, Canton, MI (US); Arman Ashrafi, Dearborn Heights, MI (US); Scott Alan Bohr, Novi, MI (US); Dwayne Pollitt, Novi, MI (US); Robert Murray, Lake Orion, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/869,409

(22) Filed: Jul. 20, 2022

(65) Prior Publication Data

US 2024/0026843 A1    Jan. 25, 2024

(51) Int. Cl.
*F02M 25/08*     (2006.01)

(52) U.S. Cl.
CPC .......... *F02M 25/089* (2013.01); *F02M 25/08* (2013.01)

(58) Field of Classification Search
CPC ............................ F02M 25/089; F02M 25/08
See application file for complete search history.

(56) References Cited

U.S. PATENT DOCUMENTS

| | | |
|---|---|---|
| 3,515,107 A | 6/1970 | Joyce |
| 5,224,456 A | 7/1993 | Hosoda et al. |
| 5,806,500 A | 9/1998 | Fargo et al. |
| 7,152,639 B2 | 12/2006 | Aschoff et al. |
| 7,318,425 B2 | 1/2008 | Kano et al. |
| 9,732,685 B2 | 8/2017 | Dudar |
| 9,797,809 B2 | 10/2017 | Dudar et al. |
| 9,909,539 B2 | 3/2018 | Fukui et al. |
| 10,156,210 B2 | 12/2018 | Dudar et al. |
| 11,104,222 B2 | 8/2021 | Dudar |
| 2014/0257668 A1* | 9/2014 | Jentz ................... F02M 25/0818 701/101 |
| 2018/0229600 A1* | 8/2018 | Higgin ............. B60K 15/03504 |
| 2019/0032613 A1* | 1/2019 | Miyabe ............. F02M 25/0827 |
| 2019/0063345 A1* | 2/2019 | Fukui ................. F02M 25/0836 |
| 2021/0339623 A1* | 11/2021 | Barkow ........... B60K 15/03519 |

* cited by examiner

*Primary Examiner* — Xiao En Mo

(74) *Attorney, Agent, or Firm* — Vincent Mastrogiacomo; Brooks Kushman P.C.

(57) ABSTRACT

A fuel vapor recirculation system includes a filler neck adapted to receive a refueling nozzle that dispenses fuel into the filler neck. A fuel tank receives fuel from the filler neck through an inlet check valve. The check valve is disposed in the fuel inlet opening and is normally closed. The check valve opens when fuel is dispensed into the fuel tank. The check valve defines a vent hole that is always open. The fuel tank also includes a fuel limiting vent valve and a grade limit vent valve. A fuel vapor cannister collects fuel vapor and selectively supplies fuel vapor to an intake manifold of a vehicle. The fuel vapor recirculation manifold receives fuel vapor only from the fuel limiting vent valve and the grade limit vent valve in the fuel tank and does not receive fuel vapor directly from the filler neck.

17 Claims, 4 Drawing Sheets

FUEL SYSTEM FUEL VAPOR RECIRCULATION SYSTEM AND METHOD

TECHNICAL FIELD

This disclosure relates to methods and systems for fuel systems that include a vehicle fuel vapor containment system.

BACKGROUND

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. When the engine is in operation, the evaporative emission control system allows the vapors to be purged into the engine intake manifold for use as fuel.

Vehicle fuel systems include a sealed recirculation manifold that recirculates fuel vapor from the filler neck, the fuel tank and various valves and a pressure transducer. Vehicles with evaporative emission control systems are known that have a filler neck recirculation tube in pneumatic communication with the filler neck to the recirculation tube network. The filler neck recirculation tube recirculates fuel during refueling that reduces air entrainment and vaporization inside the fuel tank and reduces the amount of carbon pellets required by the fuel vapor cannister. Another function of the filler neck recirculation tube is that evaporation leak detection test require a path to the filler neck to test for leaks in the filler neck or filler cap area.

This disclosure is directed to solving the above problems and other problems as summarized below.

SUMMARY

According to one aspect of this disclosure, an apparatus is disclosed the includes a fuel tank and an inlet check valve. The fuel tank has a fuel inlet opening and a filler neck through which fuel is dispensed into the fuel tank. The check valve is disposed in the fuel inlet opening, and is normally closed. The check valve is adapted to be opened when fuel is dispensed into the fuel tank. The check valve has a vent hole that is always open and enables pneumatic communication through the check valve for testing purposes while inhibiting fuel from spilling back into the filler neck.

According to another aspect of this disclosure, an apparatus is disclosed that includes a fuel tank, a filler neck, and an inlet check valve. The fuel tank defines a top opening in a top surface of the fuel tank. The filler neck supplies fuel to the fuel tank through the top opening. The inlet check valve is disposed in the top opening and has a vent opening that provides pneumatic communication between the fuel tank and the filler neck but that prevents the inlet check valve from spilling fuel from the fuel tank back to the filler neck.

According to a further aspect of this disclosure, an apparatus is disclosed that includes a filler neck adapted to receive a refueling nozzle that dispenses fuel into the filler neck. A fuel tank that receives fuel from the filler neck through an inlet check valve. The fuel tank also includes a fuel limiting vent valve and a grade limit venting valve in the fuel tank. A fuel vapor cannister that collects fuel vapor and selectively supplies fuel vapor to an intake manifold of a vehicle. A fuel vapor recirculation manifold that receives fuel vapor only from the fuel limiting vent valve in the fuel tank and the grade limit vent valve in the fuel tank and supplies fuel vapor to the fuel vapor cannister.

Other aspects of the above disclosed concepts, the vent hole may be between 1.4 mm and 1.8 mm in diameter to permit pneumatic communication between the fuel tank and the filler neck. The small diameter of the vent hole inhibits fuel from spilling fuel from the fuel tank back to the filler neck. Alternatively, the vent hole may be 1.6 mm in diameter.

Pneumatic communication between the fuel tank and the filler neck is provided solely through the vent opening when the inlet check valve is closed.

The recirculation tube manifold is in pneumatic communication with a plurality of valves in the fuel tank, a fuel vapor cannister, and a fuel tank pressure transducer. The recirculation tube manifold is only in pneumatic communication with the filler neck through the fuel tank and the inlet check valve. The plurality of valves include a grade limit venting valve, and a fuel limit venting valve. The inlet check valve is a normally closed valve that opens under light pressure of less than or equal to one inch of water and that closes after refueling.

A filler neck cap may be provided that is closed over a refueling opening at an upper end of the filler neck when not refueling. Alternatively, a flapper valve may be provided that is opened when a refueling nozzle is inserted in a refueling opening and closed when the refueling nozzle is removed from the refueling opening.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale, and some features may be exaggerated or minimized to show details of particular components. The specific structural and functional details disclosed are not to be interpreted as limiting, but as a representative basis for teaching one skilled in the art how to practice the disclosed concepts.

Various features illustrated and described with reference to any one of the figures may be combined with features illustrated in one or more of the other figures to produce embodiments that are not explicitly illustrated or described. The combinations of features illustrated provide representative embodiments for typical applications. Various combinations and modifications of the features consistent with the teachings of this disclosure could be used in particular applications or implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
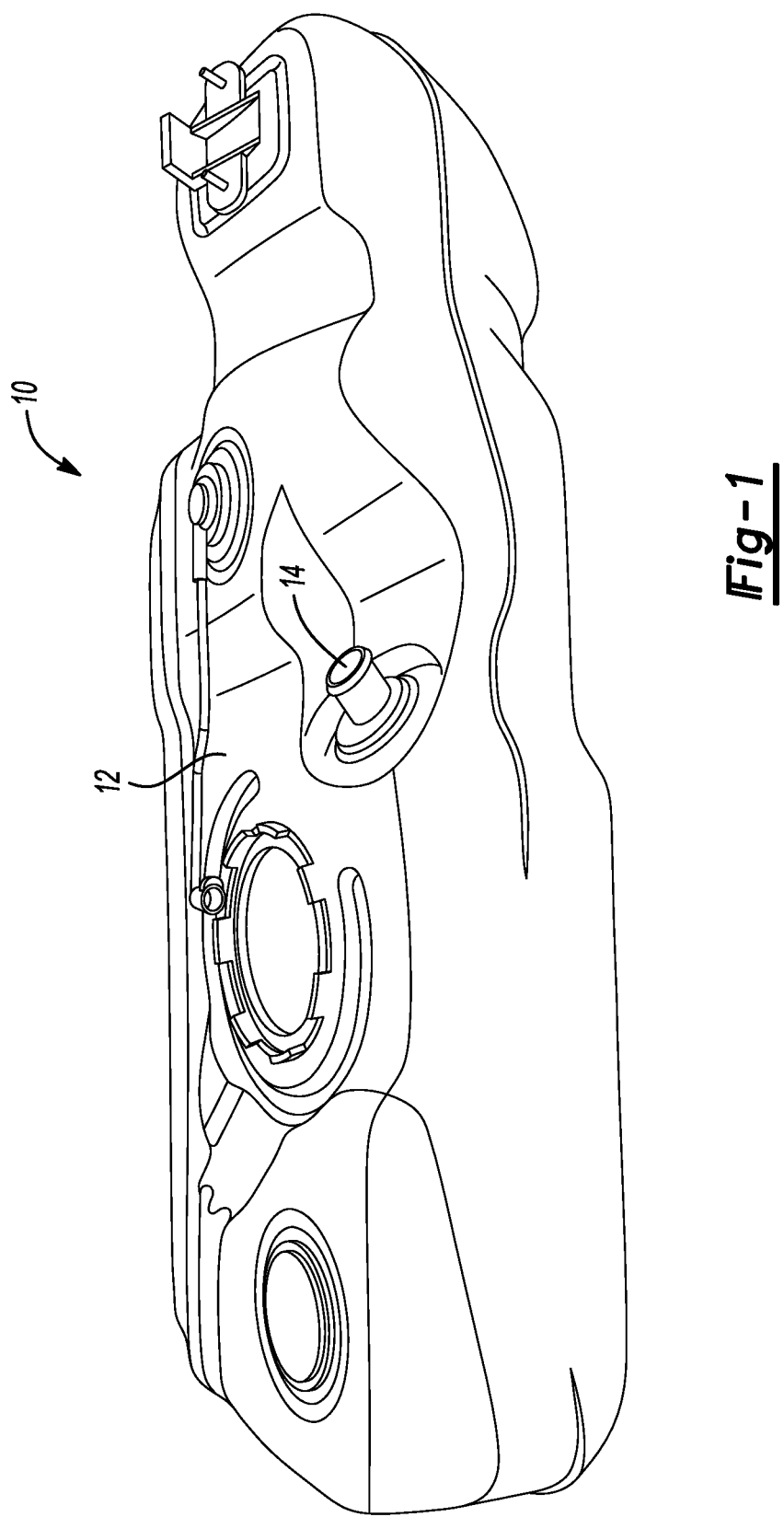
FIG. 1 is a perspective view of a fuel tank.
Figure 2:
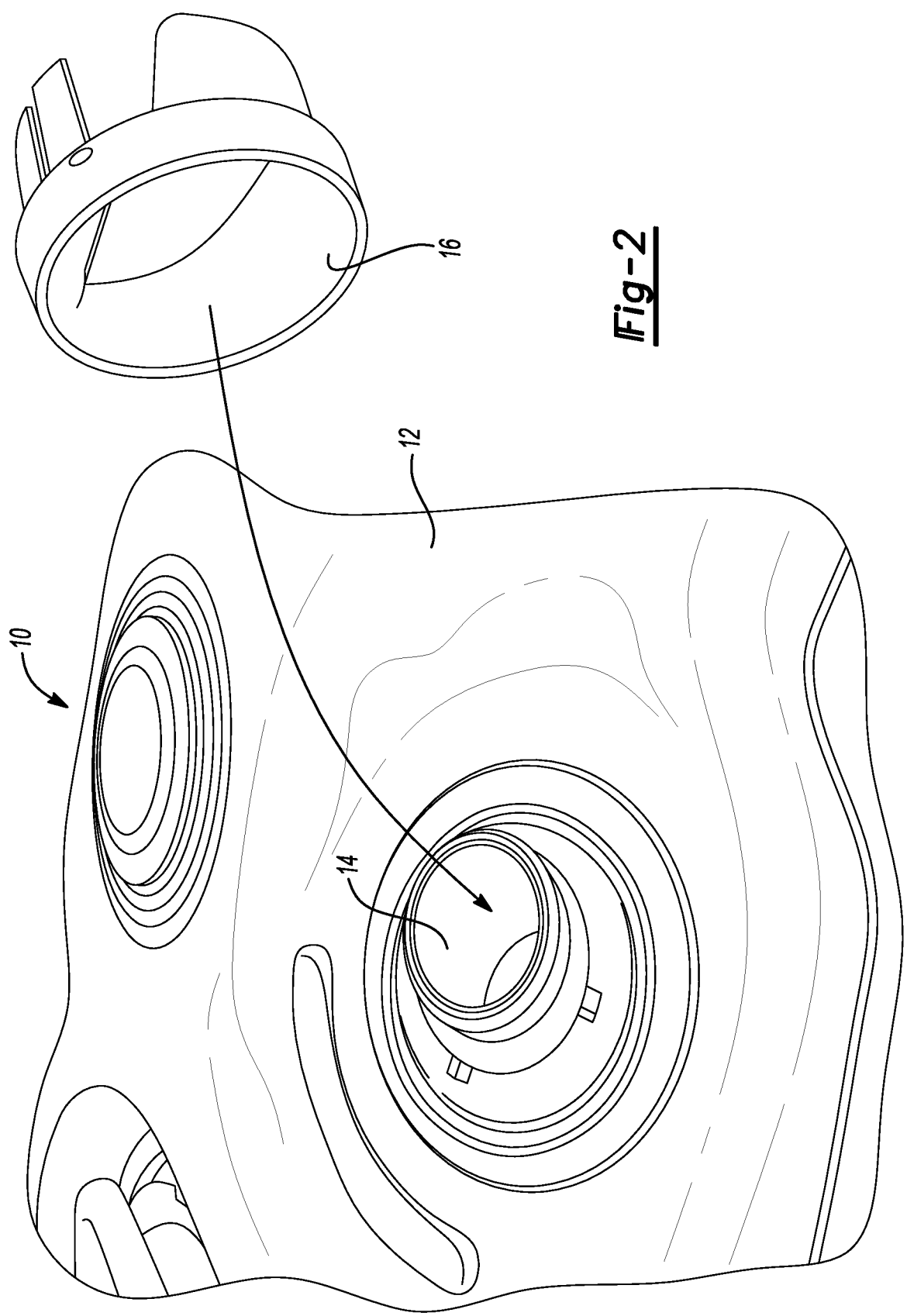
FIG. 2 is a fragmentary perspective view of a fuel fill opening defined in a top surface of the fuel tank with an inlet check valve detached.

Referring to FIGS. 1 and 2, a fuel tank 10 is illustrated that has a top wall 12 that defines a fuel inlet opening 14. An inlet check valve 16 is shown assembled to the fuel inlet opening 14. The fuel tank 10 is a top feeding fuel tank that receives fuel in the top of the fuel tank 10. The inlet check valve 16 is a normally closed valve that opens under light pressure (e.g. 1" H$_2$O) when refueling. A normally closed valve is one that is normally closed to prevent a liquid from flowing through the valve but allows liquid to flow when actuated by a controller or other mechanism. At the end of the refueling process, the inlet check valve 16 closes to prevent fuel from spilling out of the tank and back into the filler neck 18 (shown in FIG. 4) welling back from tank head pressure. The inlet check valve 16 is controlled by a controller (not shown) which in response to a fuel limiting vent valve 42 (shown in FIG. 4).

Figure 3:
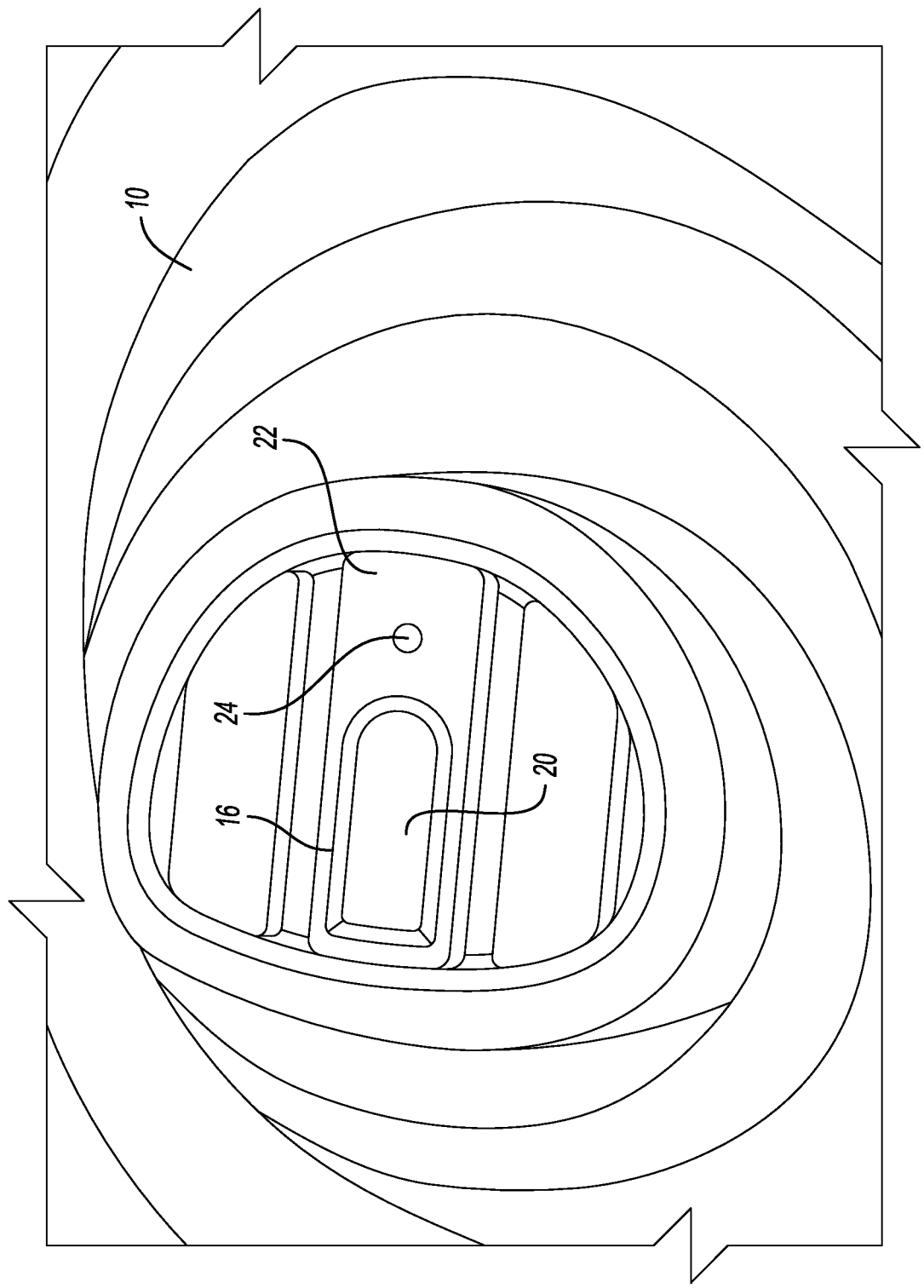
FIG. 3 is a fragmentary plan view of the inlet check valve
Figure 4:
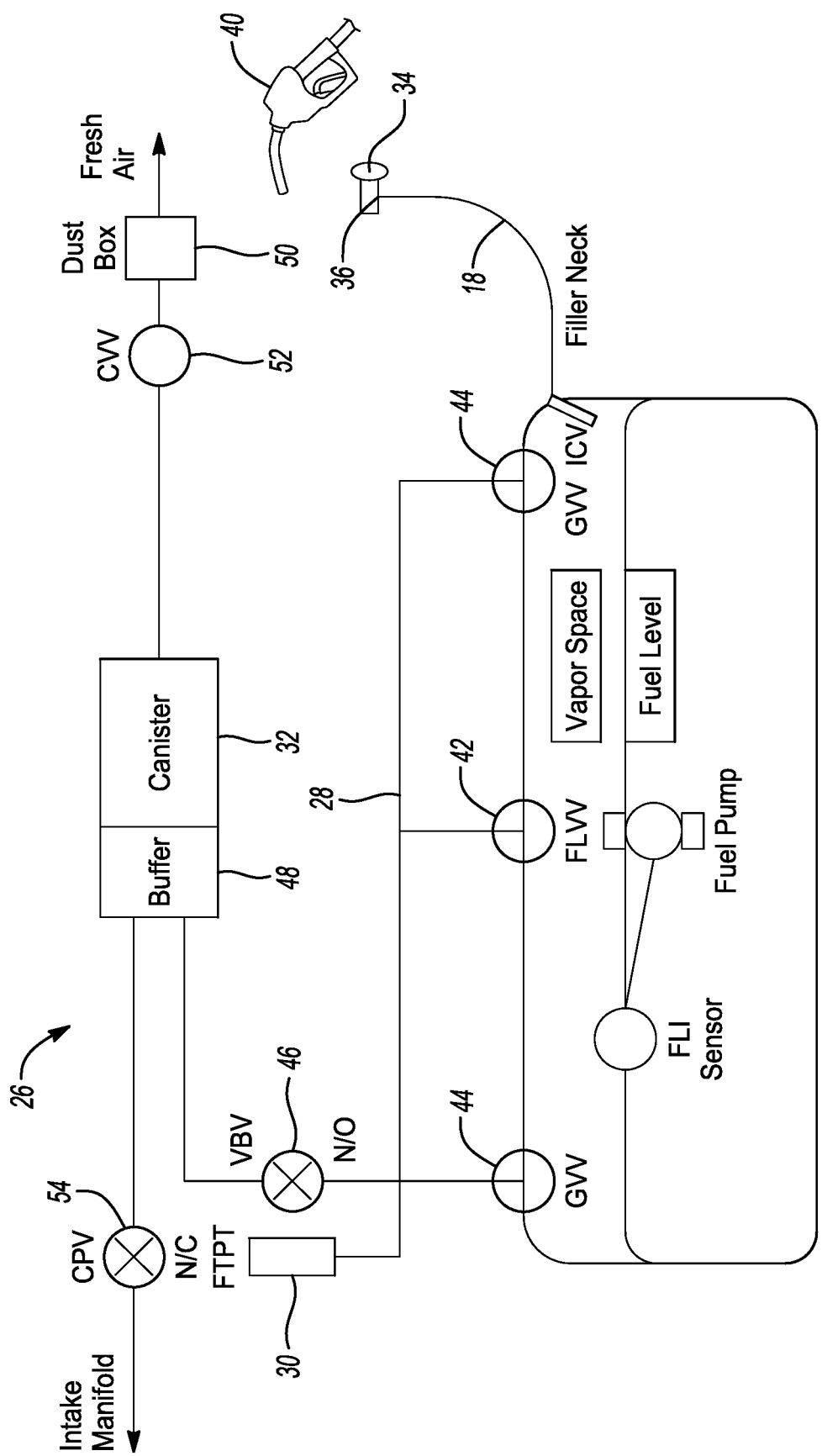
FIG. 4 is a diagrammatic view of a fuel vapor containment system.

Referring to FIG. 3, the inlet check valve 16 is shown in an enlarged view to include a flapper valve element 20 defined in a wall 22 of the inlet fuel valve 16 that faces the filler neck 18 (shown in FIG. 4). When fuel flows down the filler neck, the flapper valve element 20 opens and fuel is supplied to the fuel tank 10.

Referring to FIGS. 3 and 4, a vent hole 24 is also defined by the wall 22 that provides pneumatic communication between the fuel tank 10 and the filler neck 18 (shown in FIG. 4). Pneumatic communication through the vent hole 24 is necessary for leak testing the sealed fuel vapor containment system 26 (shown in FIG. 4). The size of the vent hole 24 is critical because if the vent hole 24 is too large fuel may spill back to the filler neck 18. If the vent hole 24 is too small the level of pneumatic communication may be insufficient for leak testing. In testing, with one design of a fuel tank 10 and filler neck 18 a vent hole 24 having a 1.6 mm diameter prevented spillback. The 1.6 mm vent hole 24 was large enough to be successfully leak tested. Other small sized vent holes ranging from 1.4 to 1.8 mm are also thought to be equally effective for other fuel tank 12 and filler neck 18 designs.

The vent hole 24 allows the fuel vapor containment system 26 to be provided without a pneumatic passageway that was required in some prior art systems. In the prior art, a tubular conduit would have been part of the recirculation manifold 28 or otherwise connected to the filler neck 18 for pneumatic communication. Instead, the vent hole 24 defined by the wall 22 of the inlet fuel check valve 16 provides pneumatic communication between the filler neck 18 and the fuel tank 10. The fuel tank 10 is in pneumatic communication through the recirculation manifold 28 with the fuel tank pressure transducer 30 and the fuel vapor cannister 32.

Referring to FIG. 4, the fuel vapor containment system 26 will be described in greater detail. The fuel vapor containment system 26 description starts with a filler neck cap 34 that is closed over a refueling opening 36 at an upper end of the filler neck 18 when not refueling. Alternatively, the fuel system may be of the capless type, and a valve element (not shown) may be provided that automatically closes off the top of the filler neck 18 when not refueling and opens when the refueling nozzle 40 is inserted.

Fuel flows through the filler neck 18 and through the inlet fuel check valve 16 (ICV in FIG. 4) and into the fuel tank 10. The fuel tank 10 may be provided with a fuel limiting vent valve 42 (FLVV in FIG. 4) and a grade limit vent valve 44 (GLV in FIG. 4) that are assembled to the top wall 12 of the fuel tank 10. Pneumatic communication between the vapor space 38 above the level of the fuel in the fuel tank and the recirculation manifold 28 is provided through the fuel limiting vent valve 42 and a grade limit vent valve 44 that are normally open valves.

The recirculation manifold 28 is also connected to the fuel tank pressure transducer 30 (FTPT) and the fuel vapor cannister 32 for pneumatic communication. A normally open vent bypass valve 46 (VBV) may be provided in a portion of the recirculation manifold 28 that is connected to the buffer 48 portion of the fuel vapor cannister 32. A dust box 50 collects dust from the air that is supplied to the fuel vapor cannister 32 when the fuel vapor cannister 32 is purged by opening the cannister vent valve 52. The fuel vapor cannister 32 collects fuel vapor from the recirculation manifold 28 and stores it until the engine is operating. When the engine is running, a cannister purge valve 54 (CPV in FIG. 4) opens and vacuum created by the intake manifold draws the fuel vapor from the fuel vapor cannister to be burned in the engine. A cannister vent valve 52 (CVV in FIG. 4) allows fresh air into the cannister 32 as the fuel vapor is purged into the intake manifold.

According to the concept disclosed, a recirculation line is not provided between the recirculation manifold 28 and the filler neck 18, the filler neck cap area 34, or capless area refueling opening 36. The vent hole 24 provides the necessary pneumatic communication that was previously provided by a branch of the recirculation manifold 28 that was open to the filler neck 18, the filler neck cap area 34, or capless area refueling opening 36.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. An apparatus comprising:
   a fuel tank having a fuel inlet opening and a filler neck through which fuel is dispensed into the fuel tank; and
   a check valve disposed in the fuel inlet opening, wherein the check valve is closed and adapted to be opened when fuel is dispensed into the fuel tank, and wherein the check valve has a vent hole that is always open.

2. The apparatus of claim 1 wherein the vent hole is between 1.4 mm and 1.8 mm in diameter to permit pneumatic communication between the fuel tank and the filler neck.

3. The apparatus of claim 2 wherein the diameter of the vent hole is adapted to inhibit fuel from spilling from the fuel tank back to the filler neck.

4. The apparatus of claim 1 further comprising:
a fuel vapor recirculation manifold that receives fuel vapor from a fuel limiting vent valve in the fuel tank and a grade limit vent valve in the fuel tank, and wherein the fuel vapor recirculation manifold supplies fuel vapor to a fuel vapor cannister.

5. An apparatus comprising:
a fuel tank defining a top opening in a top surface of the fuel tank;
a filler neck for supplying fuel to the fuel tank through the top opening; and
an inlet check valve disposed in the top opening, the inlet check valve having a vent opening that provides pneumatic communication between the fuel tank and the filler neck but that prevents the inlet check valve from spilling fuel from the fuel tank back to the filler neck.

6. The apparatus of claim 5 wherein pneumatic communication between the fuel tank and the filler neck when the inlet check valve is closed is solely through the vent opening.

7. The apparatus of claim 5 further comprising a recirculation tube manifold in pneumatic communication with a plurality of valves in the fuel tank, a fuel vapor cannister and a fuel tank pressure transducer, wherein the recirculation tube manifold is only in pneumatic communication with the filler neck through the fuel tank and the inlet check valve.

8. The apparatus of claim 7 wherein the plurality of valves includes a grade limit venting valve and a fuel limit venting valve.

9. The apparatus of claim 5 wherein the inlet check valve is a closed valve that opens under pressure of less than or equal to one inch of water and that closes after refueling.

10. The apparatus of claim 5 wherein the vent opening is between 1.4 mm and 1.8 mm in diameter.

11. The apparatus of claim 5 wherein the vent opening is 1.6 mm.

12. The apparatus of claim 5 further comprising:
a filler neck cap that is closed over a refueling opening at an upper end of the filler neck when not refueling.

13. The apparatus of claim 5 further comprising:
a flapper valve opened when a refueling nozzle is inserted in a refueling opening and closed when the refueling nozzle is removed from the refueling opening.

14. An apparatus comprising:
a filler neck adapted to receive a refueling nozzle that dispenses fuel into the filler neck;
a fuel tank that receives fuel from the filler neck through an inlet check valve, wherein the inlet check valve defines a vent opening having a diameter of between 1.4 mm and 1.8 mm in diameter;
a fuel limiting vent valve in the fuel tank;
a grade limit venting valve in the fuel tank;
a fuel vapor cannister that collects fuel vapor and selectively supplies fuel vapor to an intake manifold of a vehicle; and
a fuel vapor recirculation manifold that receives fuel vapor only from the fuel limiting vent valve in the fuel tank and the grade limit vent valve in the fuel tank, wherein the fuel vapor recirculation manifold supplies fuel vapor to the fuel vapor cannister.

15. The apparatus of claim 14 wherein the fuel vapor recirculation manifold is not in direct pneumatic communication with the filler neck, and wherein the fuel vapor recirculation manifold is only in pneumatic communication with the filler neck through the inlet check valve, the fuel tank, the fuel limiting vent valve, and the fuel limiting vent valve.

16. The apparatus of claim 15 wherein the inlet check valve is a closed valve that opens under pressure of less or equal to than one inch of water and that closes after refueling.

17. The apparatus of claim 14 wherein the vent opening has a diameter of 1.6 mm.

* * * * *